United States Patent [19]

Playfoot et al.

[11] 4,267,454

[45] May 12, 1981

[54] SELF-POWERED RADIATION DETECTOR WITH CONDUCTIVE EMITTER SUPPORT

[75] Inventors: Kerwin C. Playfoot; Richard F. Bauer, both of Horseheads, N.Y.; Norman P. Goldstein, Murrysville, Pa.

[73] Assignee: Westinghouse Electric Corp., Pittsburgh, Pa.

[21] Appl. No.: 919,572

[22] Filed: Jun. 27, 1978

[51] Int. Cl.³ .................. G01T 1/24; G01T 3/00
[52] U.S. Cl. .................... 250/370; 250/390
[58] Field of Search .............. 250/370, 390, 391, 392; 313/61 D

[56] References Cited

U.S. PATENT DOCUMENTS

| | | | |
|---|---|---|---|
| 3,259,745 | 7/1966 | Garlick et al. | 250/392 |
| 3,375,370 | 3/1968 | Hilborn | 250/370 |
| 3,591,811 | 7/1971 | Shields | 250/370 |
| 3,603,793 | 9/1971 | Warrren | 250/370 |
| 3,787,697 | 1/1974 | Shields | 250/390 |
| 3,872,311 | 3/1975 | Goldstein et al. | 250/390 |
| 3,903,420 | 9/1975 | Klar | 250/390 |
| 3,904,881 | 9/1975 | Klar et al. | 250/390 |
| 3,940,627 | 2/1976 | Klar | 250/390 |
| 4,008,399 | 2/1977 | Brown | 250/390 |
| 4,080,311 | 3/1978 | Kehl | 252/437 |

FOREIGN PATENT DOCUMENTS 2461211  6/1976  Fed. Rep. of Germany .......... 250/390

*Primary Examiner*—Alfred E. Smith
*Assistant Examiner*—Carolyn E. Fields
*Attorney, Agent, or Firm*—W. G. Sutcliff

[57] ABSTRACT

A more reliable self-powered radiation detector structure and method of manufacture is provided by a detector structure in which a relatively ductile centrally disposed conductive emitter wire supports and is in electrical contact with a generally tubular emitter electrode. The detector is fabricated by swaging and the ductile center wire insures that electrical discontinuities of the emitter are minimized.

6 Claims, 2 Drawing Figures

SELF-POWERED RADIATION DETECTOR WITH CONDUCTIVE EMITTER SUPPORT

BACKGROUND OF THE INVENTION

The present invention relates to self-powered radiation detectors in which no drive potential is needed to produce a radiation flux indicative signal. These detectors have two spaced, electrically insulated, electrodes of conductive materials which have differing response to neutron and/or gamma radiation flux levels, such as are encountered within nuclear reactors. The typical self-powered detector is a relatively small diameter tubular member with a central emitter electrode and a coaxial outer collector electrode spaced from the emitter by insulating means.

The emitter electrode material is typically a high neutron cross section material for a neutron detector, while the collector electrode material is a low neutron cross section material. An electrical charge difference is developed across these electrodes as the result of the differing neutron capture capability of the emitter and collector and consequent electron generation and migration across the insulating means. This electron charge flow is externally sensed as being indicative of a function of neutron flux. For a gamma flux detector, the same structure and general principles apply, but with the materials being selected for their differing gamma response. In almost all cases, the outer collector electrode is a hermetically sealed member of high temperature resistant, low neutron cross section, metal or alloy, such as the high nickel content steel, Inconel. Inconel is a trademarked material of the International Nickel Co.

The emitter electrode material is selected for its radiation interaction capability, and two of the most commonly used materials have been rhodium and cobalt. These materials do not have particularly advantageous mechanical ductility and are rather brittle. This greatly complicates the fabrication of reliable detectors.

The conventional fabrication technique for such self-powered detectors involves starting with a coaxial body of relatively large diameter and gradually reducing the dimensions of the detector and electrode thickness by repeated swaging. On each swaging step the detector assembly is passed through a smaller die set until the desired detector dimensions are reached. In this multiple swaging step fabrication process, the central emitter, if it is rhodium or cobalt, or other such less ductile material, often breaks apart into electrically isolated segments so as not to be usable as a detector.

In U.S. Pat. No. 3,940,627, a self-powered detector is described with a cylindrical emitter electrode of neutron responsive material, with a metal sheath or tube of non-neutron responsive material such as stainless steel about the emitter material. This metal sheath controls the gamma energy initiated delayed beta current component to the detector current for a more accurate neutron signal from the detector.

In copending application, Ser. No. 909,418, filed May 25, 1978, entitled "Compensated Self-Powered Neutron Detector" the self-powered detector includes a shield layer on the outside of a cylindrical emitter electrode, and a shield layer on the inside of a coaxial tubular collector electrode. A gamma flux responsive self-powered radiation detector with a tubular emitter electrode with insulating means with the tubular emitter is taught in copending application, Ser. No. 911,578, filed June 1, 1978, entitled "Gamma Flux Responsive Self-Powered Detector With A Tubular Emitter".

SUMMARY OF THE INVENTION

The self-powered detector of the present invention has a structure which results in significant manufacturing advantage, so that even if the brittle or low ductility emitter electrode breaks apart, the detector will still be a usable reliable detector. A central, readily swagable, relatively ductile conductive support wire is provided along the longitudinal axis of the detector. The emitter electrode is a tubular body of a conductor having a high neutron cross section or high gamma interaction probability, and is in intimate electrical contact with the supporting center wire. The center wire material is selected for its ductility and serves as the conductor which is electrically connected at one end of the detector to the coaxial signal cable which is remotely connected outside the reactor to the sensing device.

DESCRIPTION OF THE PREFERRED EMBODIMENT

Figure 1:
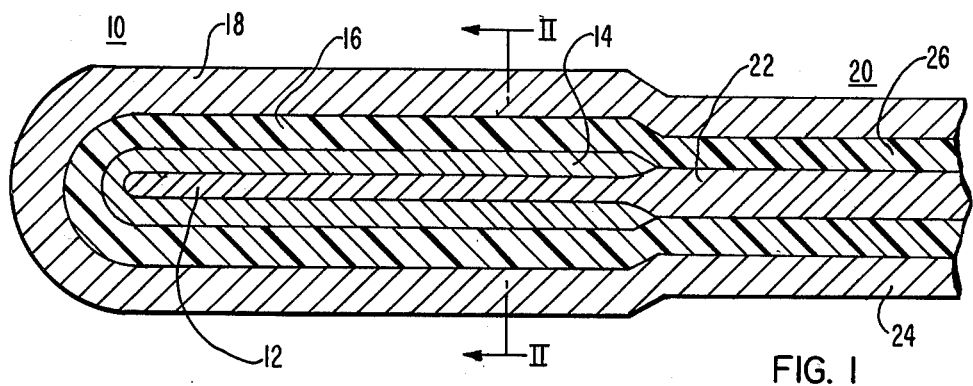
FIG. 1 is a side elevational view in section of a self-powered detector per the present invention.
Figure 2:
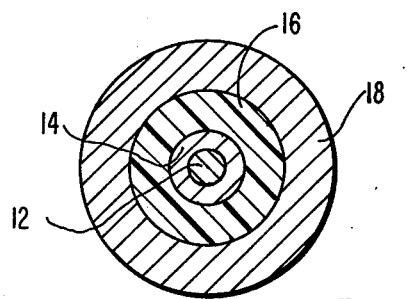
FIG. 2 is a cross sectional view through the detector of FIG. 1.

The present invention can be understood by reference to the embodiment seen in FIGS. 1 and 2. the self-powered radiation detector 10 comprises a center wire or conductor 12 along the longitudinal axis of the detector, a tubular emitter electrode 14 is disposed about and supported by the center wire 12. The center wire 12 and the tubular emitter are in intimate electrical contact. Insulating means 16 is disposed between the tubular emitter 14 and a coaxial outer tubular collector electrode 18.

The center wire conductor 12 is a relatively ductile, low neutron cross section high temperature resistant conductive material such as high nickel content steel such as Inconel steel. The tubular emitter electrode is formed of a high neutron cross section material such as rhodium or cobalt. The insulating means 16 is typically highly compacted aluminum oxide, magnesium oxide, or other such high temperature radiation resistant insulating material. The collector electrode is formed of a low neutron cross section, high temperature resistant conductor, such as Inconel steel, as is the center wire.

The detector structure can be provided by starting with a tubular body of rhodium or cobalt, which are available from Inglehart Industries, or Kulite Tungsten Corp. Into the tubular body is inserted the center support wire of Inconel steel. This subassembly is then placed inside a tubular Inconel steel collector electrode member with the insulating means of aluminum oxide spacing them apart. The assembly can then be repetitively swaged to reduce the dimensions to the desired degree. This swaging will ensure that the tubular emitter is in intimate electrical contact with the center supporting wire, and the ductile center wire will support the brittle tubular emitter.

The detector could alternatively be fabricated by starting with the ductile center wire and sintering powdered conductive material such as rhodium or cobalt onto the center wire with appropriate sintering temperature and time. The further assembly and fabrication of the detector is then swaged as described above.

The detector of the invention is electrically connected and hermetically sealed to a coaxial connection cable 20, and with the detector structure of the present invention the coax connection cable center wire 22 can serve as the center wire of the detector within the emitter. There is no need to make an electrical connection junction between the detector emitter and the connection cable as has been a problem area in the prior art detector design. The outer collector electrode 18 of the detector is hermetically sealed to and electrically connected to the tubular outer sheath 24 of the coax cable 20. Insulation means 26 is provided between the center wire 22 and outer sheath 24 of the coax cable.

The self-powered detector of the present invention by way of example has an overall outside diameter of from about 0.065 inch to 0.150 inch. For the smaller diameter which is more readily accommodated within a reactor core, the center wire or conductor has a diameter of about 0.005 to 0.010 inch. The tubular emitter has a typical outside diameter of 0.020 inch, the insulating means is about 0.010 inch thick, and the tubular collector electrode has a thickness of about 0.010–0.015 inch. For larger diameter detectors the various portions would have proportionately larger dimensions.

The detector of the present invention can be neutron or gamma sensitive with the selection of emitter material largely determining this. The detector relies upon the differing radiation interaction characteristics of the emitter and collector electrode materials to generate an electrical signal or potential, between these spaced insulated electrodes, which is a function of the incident radiation flux. For a neutron responsive detector the tubular emitter is formed of high neutron cross section material. A gamma responsive detector is provided by forming the tubular emitter of a material with high gamma interaction probability.

We claim:

1. A swage-formed elongated, self-powered radiation detector of the type wherein an electrical signal is generated as a function of the incident radiation flux interacting with insulatingly spaced coaxial conductors having differing radiation interaction characteristics, with the more radiation interactive conductor comprising a central emitter electrode and the less radiation interactive conductor comprising a tubular coaxial collector electrode with highly compacted insulating material between the electrodes, the improvement wherein the emitter electrode is a tubular body, and a ductile conductive center wire is disposed along the longitudinal axis of the detector within the tubular emitter electrode and in intimate electrical contact with the tubular emitter electrode as a result of repetitive swaging of the detector which compressively reduces the detector diameter.

2. The self-powered radiation detector set forth in claim 1, wherein the tubular emitter electrode is formed of rhodium or cobalt.

3. The self-powered radiation detector set forth in claim 1, wherein the center wire is formed of high nickel content steel which has low radiation interaction.

4. The self-powered radiation detector set forth in claim 1, wherein the detector is electrically connected to and hermetically sealed to a coax connection cable, and wherein the center conductor of the coax connection cable extends beyond the cable and forms the center wire of the detector.

5. Method of fabricating an elongated, self-powered radiation detector of the type wherein an electrical signal is generated as a function of the incident radiation flux interacting with insulatingly spaced coaxial conductors having differing radiation interaction characteristics which method comprises:

(a) providing an elongated ductile conductive center wire within an elongated tubular emitter electrode of material which has a high radiation interaction characteristic;

(b) disposing insulating means about the elongated tubular emitter body;

(c) disposing an elongated tubular collector electrode coaxial about the tubular emitter electrode and insulated therefrom, which tubular collector electrode is formed of a material with a lesser radiation interaction characteristic; and (d) swaging elongated assembly set forth in clauses (a), (b) and (c) to reduce the diameter and further elongate the thus formed self-powered detector, with the ductile conductive center wire providing support for the tubular emitter electrode and in intimate electrical contact therewith.

6. The method set forth in claim 5, wherein an extension of the ductile conductive center wire of a coaxial signal cable forms the ductile center wire.

* * * * *